(12) United States Patent
Gel

(10) Patent No.: US 10,320,608 B2
(45) Date of Patent: Jun. 11, 2019

(54) SYSTEM FOR PROVIDING TELEMATIC SERVICES AND CORRESPONDING METHOD

(71) Applicant: RENAULT s.a.s., Boulogne Billancourt (FR)

(72) Inventor: Nicolas Gel, Issy-les-Moulineaux (FR)

(73) Assignee: RENAULT s.a.s., Boulogne Billancourt (FR)

( * ) Notice: Subject to any disclaimer, the term of this patent is extended or adjusted under 35 U.S.C. 154(b) by 227 days.

(21) Appl. No.: 15/399,497

(22) Filed: Jan. 5, 2017

(65) Prior Publication Data

US 2017/0155553 A1 Jun. 1, 2017

Related U.S. Application Data

(63) Continuation of application No. 14/362,252, filed as application No. PCT/EP2012/074121 on Nov. 30, 2012, now abandoned.

(30) Foreign Application Priority Data

Dec. 2, 2011 (FR) ...................................... 11 61082

(51) Int. Cl.
G06F 15/177 (2006.01)
H04L 12/24 (2006.01)
(Continued)

(52) U.S. Cl.
CPC ............ H04L 41/0806 (2013.01); G06F 8/61 (2013.01); G06F 8/64 (2013.01); H04L 41/082 (2013.01);
(Continued)

(58) Field of Classification Search
CPC . G06F 8/61; G06F 8/64; H04L 41/082; H04L 67/12; H04L 41/0806; H04L 2012/40273
(Continued)

(56) References Cited

U.S. PATENT DOCUMENTS 7,406,169 B2 * 7/2008 Rockett ................. H04L 67/125
379/265.01
7,480,551 B1 1/2009 Lowrey
(Continued)

FOREIGN PATENT DOCUMENTS

JP 2003-110554 A 4/2003
JP 2011-148398 A 8/2011

OTHER PUBLICATIONS

Combined French Written Opinion and Search Report dated May 24, 2012 in French Patent Application No. FR1161082 with English Translation of Category of Cited Documents.
(Continued)

*Primary Examiner* — Frantz B Jean
(74) *Attorney, Agent, or Firm* — Oblon, McClelland, Maier & Neustadt, L.L.P.

(57) ABSTRACT

Method of providing services for a vehicle, the method comprising: storing for at least one model of vehicle of said group of vehicles, the configuration files for at least one service to be provided; storing a set of data pairs comprising an identifier of the control unit and an identification number of the corresponding vehicle; receiving the identification number of the vehicle from said vehicle by the services provision server; extracting the identifier of the control unit as a function of the identification number of the vehicle; —an extraction of one or more configuration files as a function of a vehicle identification datum; and—a downloading by the control unit of said vehicle from the services provision server of the configuration file or files extracted for the setting up of the service or services to be provided for the model of the vehicle.

9 Claims, 3 Drawing Sheets

(51) Int. Cl.
*G06F 8/61* (2018.01)
*H04L 29/08* (2006.01)
*H04L 12/40* (2006.01)

(52) U.S. Cl.
CPC .... *H04L 67/12* (2013.01); *H04L 2012/40273* (2013.01)

(58) Field of Classification Search
USPC ......................................................... 709/222
See application file for complete search history.

(56) References Cited

U.S. PATENT DOCUMENTS

| | | | |
|---|---|---|---|
| 2005/0027438 A1* | 2/2005 | Rockett | G08G 1/205 701/532 |
| 2005/0187674 A1 | 8/2005 | Ando | |
| 2005/0201545 A1* | 9/2005 | Rockett | H04L 67/125 379/265.01 |
| 2007/0005204 A1 | 1/2007 | Yamamoto et al. | |
| 2007/0244628 A1* | 10/2007 | Rockett | G08G 1/205 701/117 |
| 2008/0147245 A1* | 6/2008 | Koepf | G06F 11/25 701/1 |
| 2008/0306651 A1* | 12/2008 | Davis | G07C 5/008 701/33.4 |
| 2009/0126028 A1 | 5/2009 | Traenkenschuh et al. | |
| 2010/0228404 A1 | 9/2010 | Link, II et al. | |
| 2017/0026893 A1* | 1/2017 | Lagassey | G07C 5/008 |

OTHER PUBLICATIONS

International Preliminary Report on Patentability and Written Opinion dated Jun. 3, 2014 in PCT/EP2012/074121 with English language translation.

International Search Report dated Dec. 20, 2012 in PCT/EP12/074121 filed Nov. 30, 2012.

French Search Report dated May 24, 2012 in French Patent Application No. FR1161082 filed Dec. 2, 2011.

* cited by examiner

SYSTEM FOR PROVIDING TELEMATIC SERVICES AND CORRESPONDING METHOD

CROSS-REFERENCE TO RELATED APPLICATIONS

This application is a continuation application of U.S. application Ser. No. 14/362,252 filed Oct. 20, 2014, which is the U.S. National Stage application of PCT International Application No. PCT/EP2012/074121 filed Nov. 30, 2012, which claims priority to French Application No. FR1161082 filed Dec. 2, 2011. U.S. application Ser. No. 14/362,252 is herein incorporated by reference in its entirety for all purposes.

The invention relates to the provision of electronic services and especially of telematic electronic services calling upon an offboard server. The invention applies in particular to automotive vehicles.

The installation within a vehicle of a telematic control unit, which is a computer chip collecting vehicle information and transmitting it to a services provision server, is known from the prior art. It is thus possible to provide users and the driver of the vehicle with numerous services including for example Internet connectivity or improved GPS guidance (GPS an acronym standing for Global Positioning System according to a term well known to the person skilled in the art).

One of the problems with telematic control units is that a telematic control unit must be able to operate with numerous models of vehicle built by the manufacturer. Indeed, although the architecture of the vehicles in which the telematic control unit will be installed is different, the use of a single model of telematic control unit is envisaged, so as to optimize production costs.

Another problem relates to the upgradable character of the services provided. It is indeed necessary for a telematic control unit to be compatible with new services or existing services as they are upgraded.

Another problem relates to the desire of the user or users to activate, deactivate or to upgrade a service in the course of the life of the vehicle.

It is therefore necessary to envisage a telematic control unit which is configurable so that its operating mode can be adapted to all models of vehicle and which is also reconfigurable so as to be able to adapt to service upgrades.

There is described in patent application US20080147245, a procedure for a vehicle interface comprising:
  a receiving of the vehicle interface;
  an inputting of appropriate data into a retailer inventory, the activating of a SIM card for the vehicle interface;
  an installing of the vehicle interface in a determined vehicle;
  a selecting of a wireless network on the basis of the retailer inventory;
  a connecting of the vehicle interface to a port of the vehicle;
  a connecting of a configuration PC to the vehicle interface and the downloading of a modem configuration for the vehicle interface; and
  the selecting and the downloading of a file corresponding to the vehicle in the vehicle interface.

That said, in this patent application, the selecting and the downloading of the configuration file corresponding to the vehicle are carried out by an operator (cf. paragraph 74, FIG. 3 step 350). This operation may be laborious and also the operator may make a mistake.

Moreover, in this patent application, only one service is envisaged. In the general case which relates to the use of several services to be activated in the course of the life of the vehicle, selection by the operator is tiresome and may deter the user from changing his services.

Finally, deactivation of the installed service is not envisaged in this patent application.

There is proposed according to the invention, a method and a corresponding system which are aimed at solving all the problems mentioned hereinabove.

There is proposed, according to the invention, a method and a corresponding system which allow automated configuration of the services on the telematic control unit.

There is also proposed, according to the invention, a simple method making it possible to avoid configuration errors.

The subject of the invention is thus a method of providing services for a vehicle of a group of vehicles of various models, comprising a step of placing a control unit, onboard said vehicle, in communication with an offboard services provision server.

According to a general characteristic, the method comprises:
  a first storage for at least one model of vehicle of said group of vehicles, of the configuration files for at least one service to be provided;
  a second storage of a set of data pairs comprising an identifier of the control unit and an identification number of the vehicle corresponding thereto;
  a reception of the identification number of the vehicle from said vehicle by the services provision server;
  an extraction of the identifier of the control unit as a function of the identification number of the vehicle;
  an extraction of one or more configuration files as a function of an identification datum of the vehicle; and
  a downloading by the control unit of said vehicle from the services provision server of the configuration file or files extracted for the deploying of the service or services to be provided for the model of the vehicle.

It is thus possible to place the same control unit in all the vehicles of all models. Configuration thereof will be carried out remotely without operator intervention. In the course of the life of the vehicle the user will also be able to subscribe new services or update the existing services.

According to a characteristic, the method comprises:
  a transmission of an order for activation from the services provision server to the control unit; and
  a making available by the service provision server for downloading by the control unit of the configuration files extracted.

Thus, the control unit can easily download from the services provision server the necessary configuration files.

According to another characteristic, the method comprises a step of dispatching an activation message from an activation server to the services provision server so as to activate or deactivate the services of the services provision server provided to said vehicle.

This step allows centralized activation of the services. Moreover, the activation server is in general linked directly to a billing server for fast and reliable billing.

According to an additional embodiment, the method comprises:
  a processing step in the course of which the control unit processes service data flowing on communication buses of the vehicle as a function of the configuration files downloaded by the control unit;

a step of storing the service data processed in storage means;

a step of verifying the realization of conditions of transmission of the stored service data; and a step of transmitting the stored service data from the control unit to the services provision server when the transmission conditions are realized.

The services can thus be provided easily, the uploading of the data from the control unit to the services provision server can also be controlled.

According to a characteristic of this additional embodiment, the method comprises a step of transmission in the course of which the service data received by the services provision server are transmitted per service and per client of the services provision server to a server for storing the client data.

The data can thus be stored so as to be used subsequently by the client or by the service provider.

The subject of the invention is also a system for providing services for a vehicle of a group of vehicles of various models, said system comprising:

an offboard server for providing services for the vehicle;
a control unit onboard the vehicle for collecting data for the provision of services; and
first communication means for allowing a communication between the control unit and the services provision server.

According to a general characteristic, the services provision server is linked to first storage means configured to store the configuration files for at least one service to be provided for at least one model of vehicle of said group and to second storage means configured to store a set of data pairs comprising an identifier of the control unit and an identification number of the vehicle corresponding thereto, and comprises extraction means configured to extract within the second storage means, the identifier of the control unit on the basis of the identification number of the vehicle and configured to extract from the first storage means as a function of an identification datum of the vehicle, one or more configuration files, and the control unit is configured to download from the services provision server the configuration file or files extracted for the deploying of the service or services to be provided for the model of the vehicle.

According to another characteristic, the system comprises an activation server remote from said vehicle, second communication means for allowing a communication between the activation server and the services provision server, said activation server is configured to dispatch an activation message to the services provision server so as to activate or deactivate the services of the services provision server provided to said vehicle.

According to one embodiment, the onboard control unit comprises means of storage of a security certificate, said security certificate comprising the unique identifier of the control unit and the system comprises a security server remote from said vehicle, configured to authenticate the control unit on the basis of its security certificate and to establish an encrypted communication between the control unit and the services provision server using the security certificate of the control unit.

According to another embodiment, the onboard control unit comprises processing means for processing service data flowing on the communication buses of the vehicle as a function of the configuration files downloaded by the control unit, storage means for storing the processed service data and management means configured to verify the realization of transmission conditions, said control unit being configured to transmit the stored service data to the services provision server when the transmission conditions are realized.

Other characteristics and advantages of the invention will be apparent on examining the detailed description of a wholly non-limiting mode of implementation and embodiment, and the appended drawings in which:

FIG. 1 schematically illustrates a telematic control unit;

Figure 1:
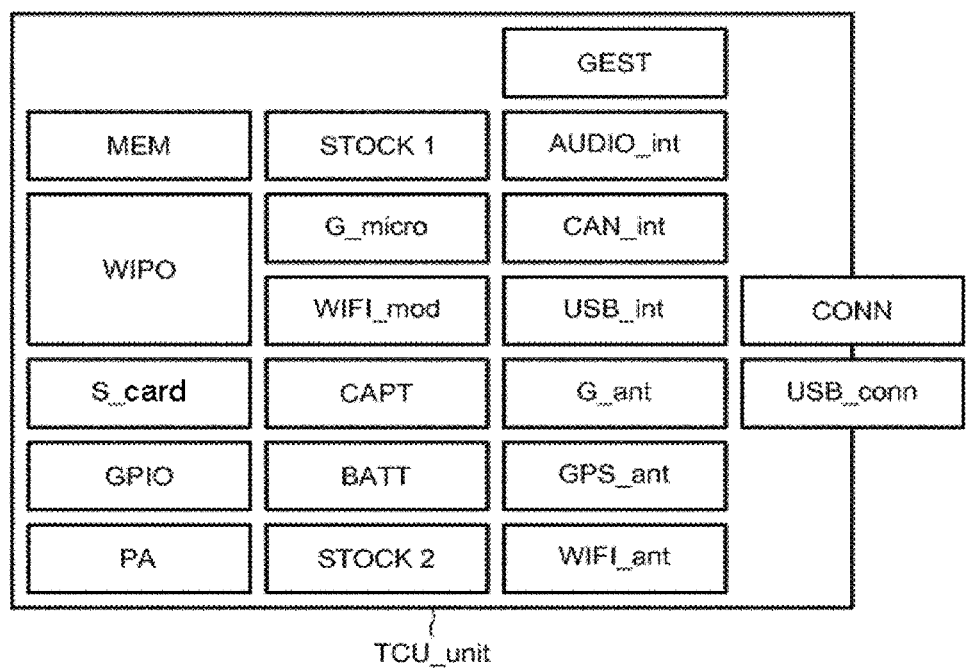

A control unit TCU (acronym standing for Telematics Control Unit according to a term well known to the person skilled in the art) TCU_unit illustrated in FIG. 1 is an electronic computer chip onboard a vehicle which comprises:

an electricity provision unit PA which manages the power supply of the control unit TCU_unit and which manages the turning on of the control unit TCU_unit and wakeup events when the vehicle is off;

a wireless processor WIPO which is associated with a SIM card (SIM an acronym standing for subscriber identity module according to a term well known to the person skilled in the art) S_card, with a memory MEM and with a GSM antenna (GSM an acronym standing for Global System for Mobile Communications according to a term well known to the person skilled in the art) G_ant for providing voice and data communication services on a GSM network;

a microcontroller GPIO for communicating with the other computer chips of the vehicle;

a GPS microprocessor G_micro and a GPS antenna GPS_ant for ensuring a geolocation service;

a WiFi module WIFI_mod and a WiFi antenna WIFI_ant for connecting to a WiFi network or for generating a WiFi access point to which the users of the vehicle can connect;

an internal battery BATT for ensuring an auxiliary power supply source for the security functionalities, for example automatic emergency calling by the control unit TCU_unit;

first storage means STOCK1 configured to store a unique identifier (not represented in the figures) of the control unit TCU_ID. According to one embodiment, the storage means STOCK1 can store a security certificate CS (not represented in the figures) for the control unit TCU_unit, the security certificate CS comprising the unique identifier of the control unit TCU_ID;

a motion detector CAPT for detecting the displacement of the vehicle although the vehicle is not enabled;

a main connection CONN;

a USB interface (USB acronym standing for Universal Serial Bus according to a term well known to the person skilled in the art) USB_int and a USB connection USB_conn;

an audio interface AUDIO_int;

processing means comprising an interface CAN_int of CAN type (CAN acronym standing for Controller Area Network according to a term well known to the person skilled in the art). The interface CAN_int is able to read the data traveling on the communication bus of the vehicle CAN-M (CAN-M standing for multimedia CAN, represented in FIG. 2) which allows the transport of the multimedia data and the navigation data and on the communication bus of the vehicle CAN-V (CAN-V standing for vehicle CAN, represented in FIG. 2) which allows the transport of the data relating to the operation of the vehicle for example consumption, charge remaining, speed etc.;

second storage means STOCK2 for storing the data processed by the processing means comprising the interface CAN_int; and management means GEST configured to verify the realization of data uploading conditions.

Figure 2:
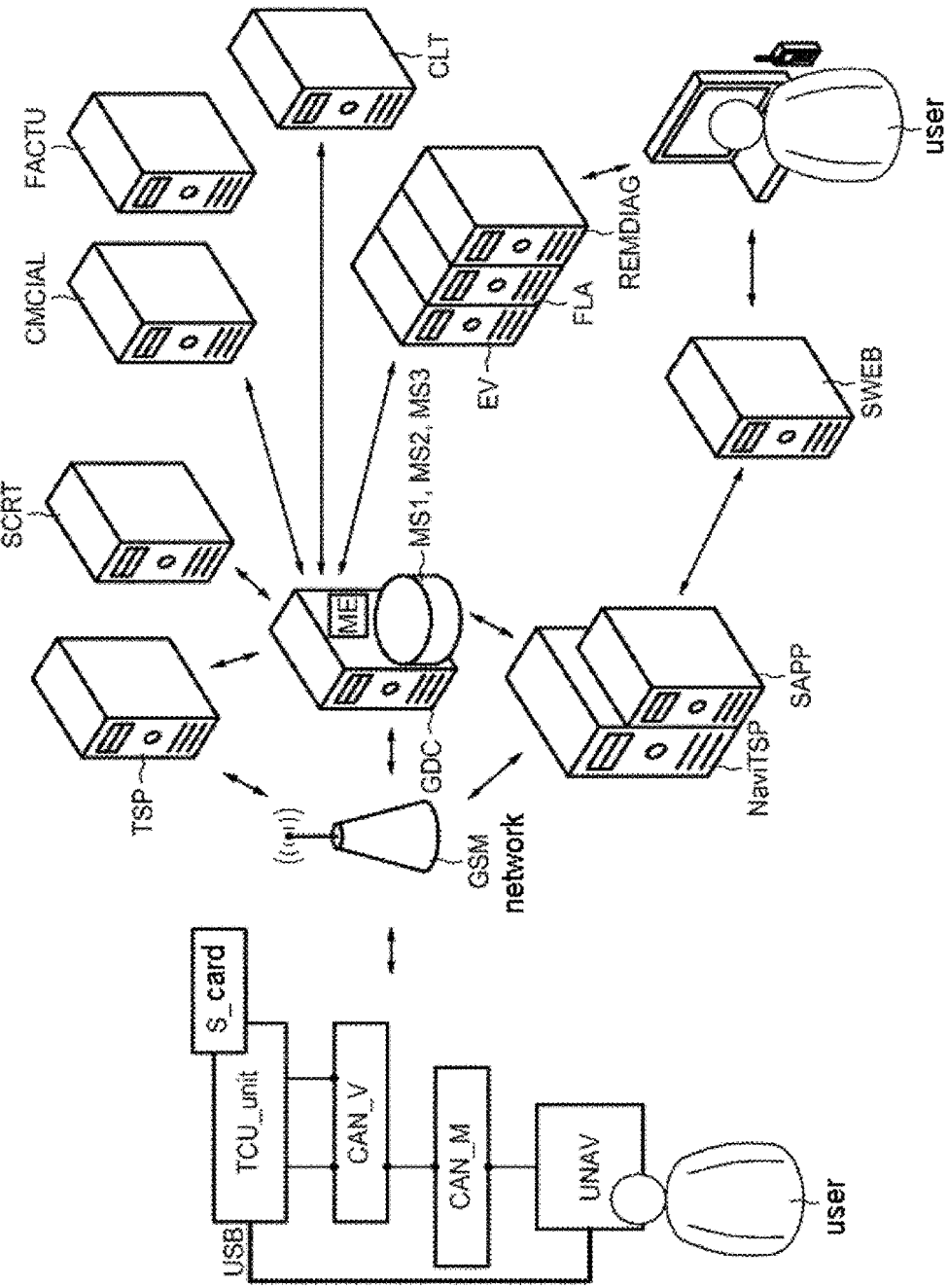
FIG. 2 illustrates a system for providing services for the vehicle comprising the telematic control unit.

The system of FIG. 2 illustrates a system for providing services comprising an onboard control unit TCU_unit on an automotive vehicle, a navigation unit UNAV, a GSM network, a server TSP, a services provision server GDC linked to storage means MS1, MS2 and MS3, a security server SCRT, and several other servers: NaviTSP, SAPP, CMCIAL, FACTU, SWEB, EV, FLA, REMDIAG and CLT. The servers GDC NaviTSP, SAPP, CMCIAL, FACTU, SWEB, EV, FLA, REMDIAG and CLT are hosted in telecommunication premises belonging for example to the manufacturer of the vehicle.

The control unit TCU_unit is capable of interacting with the CAN-V bus and the CAN-M bus. By way of exemplary realization the control unit TCU_unit is capable of collecting and processing information from the CAN-V bus and of collecting, processing and dispatching data on the CAN-M bus. The control unit TCU_unit comprises a SIM card S_card as well as a USB interface USB_int and a USB connection USB_conn linked to a navigation unit UNAV. The GSM network makes it possible to link the unit TCU_unit to the service provision server GDC.

The unit TCU_unit is provided, on its installation, without any configuration, that is to say without configuration or activation of service and without operating mode. The configuration and activation of the services as well as the configuration of the operating mode of the unit TCU_unit are carried out via the server GDC.

On installation of the control unit TCU_unit, a unique identifier TCU_ID alone is introduced into the storage means STOCK1 of the unit TCU_unit. According to one embodiment, the storage means STOCK1 of the unit TCU_unit can comprise a security certificate CS, said security certificate CS comprising the unique identifier of the control unit TCU_ID.

The server GDC is configured to communicate with the other data servers so as to ensure a processing of the service data received from the control unit. Subsequent to this processing data are returned to the control unit so as to provide the service to the user.

The server GDC is linked to the first storage means MSI configured to store configuration files. The means MSI comprise a configuration file for each service for each model of vehicle. Indeed, the architectures especially those of the CAN buses vary as a function of model, it is therefore necessary to have a different configuration file for each model of vehicle. The configuration of the operating mode of the control unit TCU_unit differing for each model of vehicle is also stored in the means MSI for example in the form of a dedicated configuration file or within another services configuration file.

The server GDC is also linked to the second storage means MS2. These second means MS2 are configured to store identifying pairs of the control unit TCU_ID and identification number of the vehicle VIN (acronym standing for Vehicle Identification Number according to a term well known to the person skilled in the art). According to another embodiment, the means MS2 are configured to store triplets comprising in addition to the identifier TCU_ID and the identification number VIN, the model of the vehicle which has been determined previously by the server GDC on the basis of the number VIN.

The server GDC comprises extraction means ME for extracting within the second storage means MS2, the identifier TCU_ID on the part of the control unit TCU_unit on the basis of the identification number of the vehicle VIN.

The server GDC can also on the basis of the identification number of the vehicle VIN determine the model of the vehicle. Indeed, as mentioned hereinabove the unique number VIN comprises information relating to the model of the vehicle. According to another embodiment the model of the vehicle is already stored in the second storage means MS2, it is then extracted at the same time as the identifier TCU_ID.

The server GDC comprises the third storage means MS3. These third means MS3 are configured to store the so-called service data previously processed and dispatched by the control unit TCU_unit.

The extraction means ME are configured to extract the service data per service and per client from the means MS3 so as to transmit them to the server CLT.

The extraction means ME are also configured to extract in the first storage means the file for configuration on the basis of the model of the vehicle.

The server SCRT is a security server. It makes it possible to authenticate the security certificate of a unit TCU_unit and to establish an encrypted communication between the unit TCU_unit and the server GDC.

The server REMDIAG is a server which allows a technician connected on the basis of a computer or of another communication means, such as a mobile telephone, to for example collect information relating to the quality and/or the wear of the vehicle such as for example the vehicle's mean consumption of electricity or fuel.

The server FLA is a server which allows the user connected on the basis of a computer or of another communication means, such as a mobile telephone, to for example manage a fleet of automotive vehicles.

The server EV is a server which allows the user connected on the basis of a computer or of another communication means, such as a mobile telephone, to connect to the system for providing services so as for example to ascertain the electric battery state or to program the charging of the battery.

The server SWEB is a WEB server (according to a term well known to the person skilled in the art) which allows the user connected on the basis of a computer or of another communication means, such as a mobile telephone, to connect to the system for providing services so as for example to purchase a new service or update a service.

The server SAPP is an application server which comprises all the services which can be provided by the system for providing services.

The server NaviTSP is a navigation server which allows for example the provision of an improved guidance service in which the user can for example view the traffic in real time or obtains tourist information.

The server TSP is a server which allows emergency call sending.

The server CMCIAL is a server which makes it possible to activate the provision of services by the server GDC.

The server FACTU is a billing server which makes it possible to bill the services provided to the vehicle.

The server CLT is a client server which makes it possible to store data intended for the users and to activate services on the server GDC by way of the server CMCIAL.

In the case of an individual, the server CLT can be the server SWEB via which the user can activate or deactivate a service. In the case of a professional, the server CLT can be a server hosted at the professional's premises, thereby allowing him to interact via the server CMCIAL with the services provided to his vehicle fleet.

Figure 3:
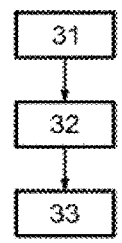
FIGS. 3 and 4 illustrate steps of methods of preparing data.

FIG. 3 illustrates steps of a method of preparing data. The method comprises three steps.

A step 31 in the course of which is generated per service and per model of vehicle, a configuration file.

This configuration file can comprise the list of the service data collected and returned by the unit TCU_unit, the addresses on the communication buses at which the service data must be collected and time and/or event conditions for transmitting the service data from the control unit to the server GDC. By way of exemplary realization the time and/or event conditions specify the interval between two transmissions of the service data from the control unit to the server GDC. The configuration file can also comprise the parameters relating to the operating mode of the control unit TCU_unit for a given model of vehicle.

A step 32 in the course of which the file is transmitted to the server GDC.

A step 33 in the course of which the file is converted by the server GDC and stored in the first storage means MSI.

Figure 4:
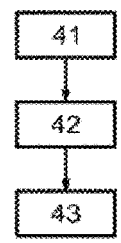

FIG. 4 illustrates steps of a method of preparing data. The method comprises three steps.

A step 41 in the course of which the factory installs a unit TCU_unit with an identifier TCU_ID in a vehicle of number VIN.

A step 42 in the course of which the factory transmits the information pair VIN and TCU_ID to the GDC.

A step 43 in the course of which the server GDC stores the data pair in the second storage means MS2.

According to another embodiment, the server GDC determines the model of the vehicle as a function of the VIN number and then stores the triplet comprising the data pair and the model of the vehicle in the second storage means MS2.

Figure 5:
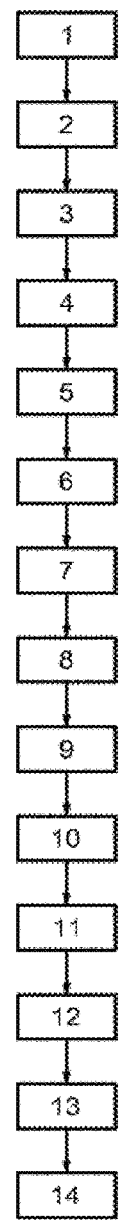
FIGS. 5 and 6 illustrate steps of methods of providing services.

FIG. 5 illustrates steps of a method of providing services. The method comprises fourteen steps:

a step 1 of request of activation of services for a vehicle, transmitted to the server CMCIAL. This step is carried out by the dispatching of a message on the part of the client server CLT comprising an identifier of the service and the identification number of the vehicle VIN;

a step 2 of activating services within the server GDC. This step is carried out by the dispatching of a message from the server CMCIAL to the server GDC. This message comprises the identifier of the service and the identification number of the vehicle VIN;

a step 3 of extracting within the second storage means MS2 the identifier TCU_ID corresponding to the identification number of the vehicle VIN;

a step 4 of extracting within the first storage means MSI the configuration file corresponding to the service requested as a function of an identification datum of the vehicle, for example the model of vehicle, the identification number VIN for the vehicle or the identifier TCU_ID;

a step 5 of transmitting an order for activation of the server GDC to the unit TCU_unit;

a step 6 of authenticating the unit TCU_unit with the server SCRT on the basis of the security certificate CS;

a step 7 of establishing an encrypted connection between the unit TCU_unit and the server GDC using the security certificate CS stored in the unit TCU_unit;

a step 8 of making available by the server GDC for downloading of the configuration file extracted;

a step 9 of downloading by the unit TCU_unit the configuration file from the server GDC;

a step 10 of applying the configuration in the unit TCU_unit;

a step 11 of acknowledgment of the server GDC by the unit TCU_unit, in the course of which the unit TCU_unit informs the server GDC that the downloading of the configuration file was successful and that the configuration file is now applied in the unit TCU_unit;

a step 12 of acknowledgment of the server CMCIAL by the server GDC, in the course of which the server GDC informs the server CMCIAL that the configuration file is now applied in the unit TCU_unit. The server CMCIAL then activates the service contract in respect of the client;

a step 13 of storage by the server GDC of the activated/deactivated state of the service; and a step 14 of starting the service within the control unit TCU_unit. This step 14 comprises a transmission of the data on the CAN buses as a function of the configuration files for each of the services, it will be described in greater detail in FIG. 6.

There has been described hereinabove a method of activation and of configuration of a service. The method of deactivation with the aid of a service deactivation configuration file is identical, only the storage step 13 is variable depending on whether the service is activated or deactivated.

Figure 6:
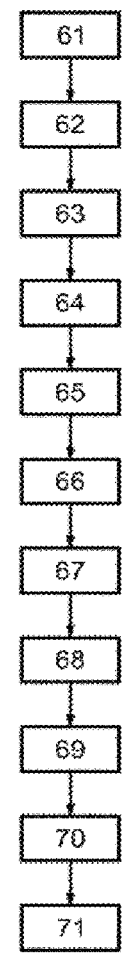

FIG. 6 illustrates another method of service provision.

The method comprises 11 steps:

a step 61 of starting the vehicle;

a processing step 62 comprising a step of reading the service data on the CAN-V and CAN-M communication buses carried out by the interface CAN_int and a step of calculation on the basis of the service data read. These steps are carried out per service as a function of the configuration files. The read and processed data are termed service data since they will be used by the services provision server GDC to provide the services;

a step 63 of storing the results in the storage means STOCK2;

a step 64 carried out by the management means GEST in the course of which the unit TCU_unit verifies for each service the conditions of the times and/or event of uploading of the service data stored in memory. A following step 65 is then triggered when for at least one service the time and/or event conditions are satisfied;

in the course of step 65 the unit TCU_unit opens a communication channel to the server GDC, connects, authenticates itself and transfers the service data in an encrypted form to the server GDC;

a step 66 in the course of which the server GDC verifies the service data received and acknowledges receipt to the unit TCU_unit;

a step 67 of deleting the service data whose receipt has been acknowledged in the unit TCU_unit;

a step 68 of closing of the communication channel by the unit TCU_unit;

a step 69 in the course of which the server GDC transfers at least part of the service data received from the unit TCU_unit to the server CLT. The data are transferred per client and per service;

a step 70 in the course of which the server CLT verifies the service data received and acknowledges receipt to the server GDC; and a step 71 of deleting the service data whose receipt has been acknowledged in the server GDC.

The invention claimed is:

1. A method of providing services for a vehicle of a group of vehicles of various models, comprising:
providing a telematics controller, onboard said vehicle, in communication with an offboard services provision server, the provided telematics controller being initially provided with an identifier of the telematics controller stored therein and without configuration or activation of service and without operating mode;
storing, in a first storage, for at least one model of vehicle of said group of vehicles, configuration files for at least one service to be provided;
storing, in a second storage, a set of data pairs comprising the identifier of the telematics controller and an identification number of the vehicle corresponding thereto;
receiving the identification number of the vehicle from said vehicle by the services provision server;
extracting the identifier of the telematics controller as a function of the identification number of the vehicle;
extracting one or more configuration files as a function of an identification datum of the vehicle; and
downloading, by the telematics controller of said vehicle from the services provision server, the configuration file or files extracted for deploying of the service or services to be provided for the model of the vehicle.

2. The method as claimed in claim 1, comprising:
transmitting an order for activation from the services provision server to the telematics controller; and
making available for downloading by the telematics controller, by the services provision server, the configuration files extracted.

3. The method as claimed in claim 1, comprising dispatching an activation message from an activation server to the services provision server to activate or deactivate the services of the services provision server provided to said vehicle.

4. The method as claimed in claim 1, comprising:
processing, using the telematics controller, service data flowing on communication buses of the vehicle as a function of the configuration files downloaded by the telematics controller;
storing the service data processed in a storage;
verifying the realization of conditions of transmission of the stored service data; and
transmitting the stored service data from the telematics controller to the services provision server when the transmission conditions are realized.

5. The method as claimed in claim 4, comprising transmitting the service data received by the services provision server per service and per client of the services provision server to a server to store the client data.

6. A system for providing services for a vehicle of a group of vehicles of various models, said system comprising:
an offboard server configured to provide services for the vehicle;
telematics control circuitry onboard the vehicle configured to collect data for provision of the services; and
first circuitry configured to allow communication between the telematics control circuitry and a services provision server,
wherein the services provision server is linked to a first storage configured to store configuration files for at least one service to be provided for at least one model of vehicle of said group, and to a second storage configured to store a set of data pairs comprising an identifier of the telematics control circuitry and an identification number of the vehicle corresponding thereto, and is configured to:
extract within the second storage, the identifier of the telematics control circuitry based on the identification number of the vehicle, and
extract from the first storage as a function of an identification datum of the vehicle, one or more of the configuration files,
wherein the telematics control circuitry is configured to download from the services provision server the configuration file or files extracted for the deploying of the service or services to be provided for the model of the vehicle.

7. The system as claimed in claim 6, comprising:
an activation server remote from said vehicle; and
second circuitry configured to allow communication between the activation server and the services provision server, said activation server being configured to dispatch an activation message to the services provision server to activate or deactivate the services of the services provision server of services provided to said vehicle.

8. The system as claimed in claim 6,
wherein the telematics control circuitry is configured to store a security certificate, said security certificate comprising the unique identifier of the telematics control circuitry, and
wherein the system comprises a security server remote from said vehicle, configured to authenticate the telematics control circuitry based on the security certificate and to establish an encrypted communication between the telematics control circuitry and the services provision server using the security certificate of the telematics control circuitry.

9. The system as claimed in claim 6, wherein the telematics control circuitry is configured to process service data flowing on the communication buses of the vehicle as a function of the configuration file or files downloaded by the telematics control circuitry, store the processed service data and verify the realization of transmission conditions, and transmit the stored service data to the services provision server when the transmission conditions are realized.

* * * * *